United States Patent
Taylor et al.

(10) Patent No.: US 7,600,630 B2
(45) Date of Patent: Oct. 13, 2009

(54) DEVICE TO AID PACKAGING ITEMS

(75) Inventors: Alfred A. Taylor, Lugarno (AU); George Tsoukalas, Chester Hill (AU)

(73) Assignee: TNA Australia Pty. Limited, Lidcombe, NSW (AU)

(*) Notice: Subject to any disclaimer, the term of this patent is extended or adjusted under 35 U.S.C. 154(b) by 0 days.

(21) Appl. No.: 10/371,164

(22) Filed: Feb. 19, 2003

(65) Prior Publication Data

US 2004/0003983 A1     Jan. 8, 2004

(30) Foreign Application Priority Data

Feb. 19, 2002     (AU) ................................ PS0614

(51) Int. Cl.
 *B65G 47/26* (2006.01)
(52) U.S. Cl. .................. 198/470.1; 198/803.7
(58) Field of Classification Search .......... 198/470.1, 198/471.1, 377.03, 377.04, 377.08, 377.07, 198/867.02, 867.03, 867.05, 803.3, 803.5, 198/803.7; 271/275–277, 82
See application file for complete search history.

(56) References Cited

U.S. PATENT DOCUMENTS

| | | | |
|---|---|---|---|
| 3,182,813 A | | 5/1965 | Goodell et al. |
| 3,232,446 A | | 2/1966 | Spurr et al. |
| 3,659,694 A | | 5/1972 | Harris |
| 3,837,474 A | | 9/1974 | Brooke |
| 3,865,631 A | * | 2/1975 | Clayman ................ 429/52 |
| 3,868,009 A | | 2/1975 | Billi et al. |
| 3,899,863 A | | 8/1975 | Seragnoli et al. |
| 4,283,973 A | | 8/1981 | Spencer |
| 4,629,175 A | * | 12/1986 | Fischer et al. ............ 271/202 |
| 4,799,664 A | * | 1/1989 | Burger ................... 271/277 |
| 4,883,163 A | | 11/1989 | Gamberini et al. |
| 5,186,107 A | * | 2/1993 | Wieland ................. 101/409 |
| 5,425,837 A | * | 6/1995 | Hansch .................. 156/536 |
| 5,450,944 A | | 9/1995 | Bonnet |
| 5,560,599 A | * | 10/1996 | Curley et al. ............. 271/270 |
| 5,871,079 A | | 2/1999 | Nannini et al. |
| 6,089,157 A | * | 7/2000 | Becker et al. ............ 101/230 |
| 6,098,543 A | * | 8/2000 | Becker et al. ............ 101/410 |
| 6,164,436 A | | 12/2000 | Taylor |
| 6,224,050 B1 | * | 5/2001 | Wicki .................... 271/37 |
| 6,227,589 B1 | | 5/2001 | Brown et al. |
| 6,612,563 B1 | * | 9/2003 | Noll, Jr. ................. 271/69 |
| 6,619,651 B2 | * | 9/2003 | Mader .................... 271/82 |
| 2001/0047639 A1 | * | 12/2001 | Tale'et al. ............... 53/234 |

FOREIGN PATENT DOCUMENTS

| | | |
|---|---|---|
| DE | 19616989 C1 | 10/1997 |
| EP | 0497689 B1 | 4/1995 |
| EP | 0860362 B1 | 1/2002 |

(Continued)

*Primary Examiner*—Mark A Deuble
(74) *Attorney, Agent, or Firm*—Townsend and Townsend and Crew, LLP

(57) ABSTRACT

A conveyor device 10 to aide a person 11 to place bags 12 of snack foods in a box 13. The device includes a base 14 that rotatably supports a hub 17. The hub 17 has a plurality of clips 20 that engage the bags 12 and move them to a position at which the bags 12 are griped by the person 11 and placed in the box 13.

10 Claims, 3 Drawing Sheets

FOREIGN PATENT DOCUMENTS

| | | |
|---|---|---|
| GB | 403711 A | 12/1933 |
| GB | 2092090 A | 8/1982 |
| GB | 2211477 A | 7/1989 |
| GB | 2312411 A | 10/1997 |
| WO | WO 93/10005 A2 | 5/1993 |
| WO | WO 93/25440 A1 | 12/1993 |

* cited by examiner

DEVICE TO AID PACKAGING ITEMS

TECHNICAL FIELD

The present invention relates to a device to aid workers to place items in a box or bag, and more particularly, but not exclusively, to aid a worker in placing a plurality of bags in a box.

BACKGROUND OF THE INVENTION

Typically, bags containing food items such as snack foods arrive at a packing station on a conveyor. A worker gathers the bags and places them in an adjacent box. This process is generally time-consuming and therefore expensive.

The above-discussed problem is the subject of U.S. Pat. No. 6,164,436.

OBJECT OF THE INVENTION

It is an object of the present invention to overcome or substantially ameliorate the above-mentioned disadvantage of the packing method described.

SUMMARY OF THE INVENTION

There is disclosed herein a conveyor device, the device including:

a base;

a clip assembly including a hub rotatably mounted on the base for angular movement relative thereto about an axis, a plurality of clips mounted on the hub so as to be moved thereby along a generally circular path, the path having a lowermost segment and an upper segment, the clips being adapted to each receive an item, each clip having an open configuration enabling an item to be engaged therein and a closed configuration holding the item;

a clip actuating mechanism to operate the clips so that the clips move between the open configuration and the closed configuration at a predetermined angular position with respect to the axis so that the clips are in the closed configuration at the lowermost segment and in the open configuration at the upper segment; and drive means to cause angular movement of the hub so that the items are delivered to a further angular position at which a person can be positioned so that the person can engage the items and remove the items from the clips.

Preferably, the axis is substantially horizontal so that the hub is generally located in a vertical plane.

In a further preferred form the axis is inclined by an acute angle to the horizontal so that the hub extends upwardly and away from the person. Preferably the angle is an angle of about 5° to about 20°. Preferably the angle is about 10°.

Preferably, each clip includes a first jaw, the first jaw being fixed with respect to the hub, and a second jaw movably mounted on the hub so as to be movable with respect to the first jaw between the open and closed positions of the clip.

Preferably, the hub is positioned so that the lowermost segment is approximately shoulder height.

Preferably, the second jaw is resiliently urged towards the first jaw, and the actuating mechanism is a cam member located adjacent the predetermined angular position so as to engage the second jaws to cause pivoting thereof to an open position to receive an item, with the second jaw moving to the closed position of the clip upon passing the cam member.

In a further preferred form the device includes ducting extending to each fixed jaw so that upon a vacuum being delivered thereto the items are urged into contact with the fixed jaws.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 2:
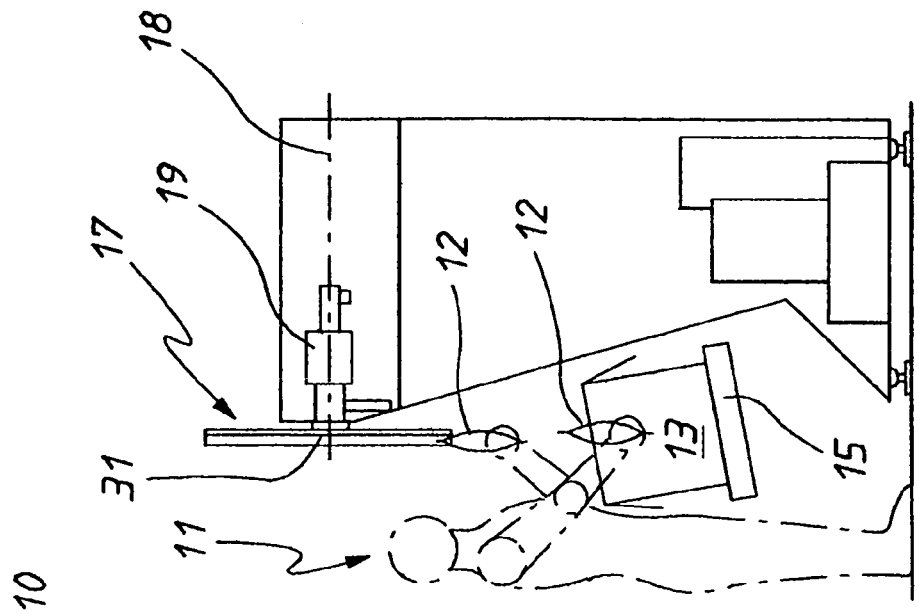
FIG. 2 is a schematic side elevation of the device of FIG. 1.
Figure 1:
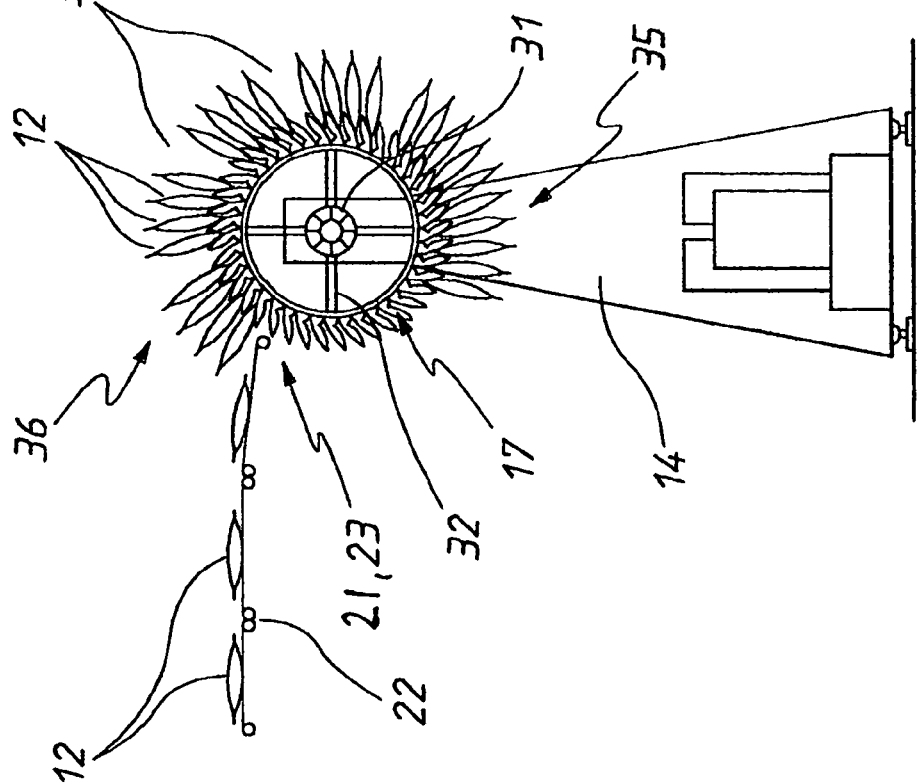
FIG. 1 is a schematic front elevation of a device to aid a person placing bags of snack foods in a box.
Figure 3:
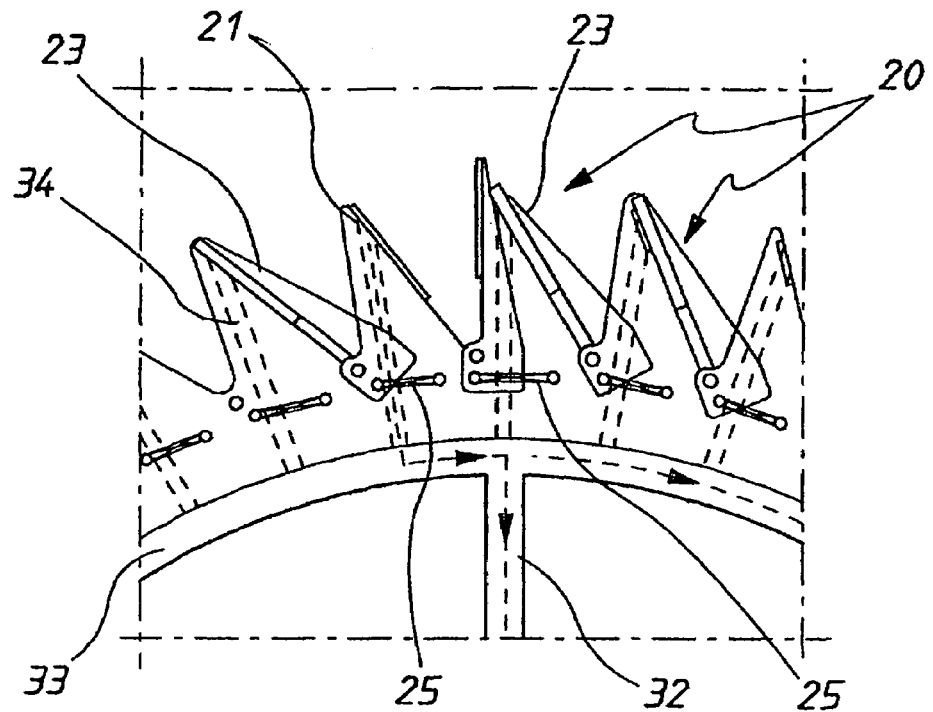
FIG. 3 is a schematic enlarged front elevation of a plurality of clips employed in the device of FIG. 1.

In the accompanying drawings, there is schematically depicted a conveyor device 10 to aid a person 11 to place bags 12 of snack foods in a box 13. The device 10 includes a stand or base 14 that rests on a floor surface so as to extend upwardly therefrom. Typically adjacent the base 14, there would be provided a conveyor or supporting table 15, so that boxes 13 may be positioned adjacent the device 10.

The device 10 further includes a hub 17 rotatably mounted on the base 14 for angular movement (rotation) about a generally horizontal axis 18. Also mounted in the base 14 is a motor (preferably electric) 19 that rotates the hub 17. Typically, the device 10 would include switches (such as pedals) that are used by the person 11 to control the delivery of electric energy to the motor 19 to thereby control the hub 17. Alternatively, the motor 19 may be electronically controlled.

Attached to the hub 17 is a plurality of clips 20 that engage the bags 12. The bags 12 are delivered to the device 10 by means of a conveyor 22, with the bags 12 mounted thereon in a particular orientation, that is, with an end seal of the bag being positioned to enter a respective one of the clips 20.

Each clip 20 includes a fixed jaw 21 and a movable jaw 23 associated with each fixed jaw 21. Each clip 20 has two configurations, that is, an open configuration ready to receive one of the bags 12, and a closed configuration securing one of the bags 12 to the hub 17. The open configuration of each jaw 20 is a configuration in which the jaw 23 is spaced from the jaw 21. In the closed position, the jaw 23 is positioned in contact with or adjacent its respective fixed jaw 21 so that a portion of the bag 12 is located therebetween and secured to the hub 17.

Each jaw 23 is pivotably mounted on the hub 17 by means of a pin 24. A spring 25 extending between each jaw 23 and the hub 17 urges each jaw 23 to pivot toward its respective fixed jaw 21. Accordingly, the jaws 23 are moved along a predetermined path and are moved from an open configuration to a closed configuration at a predetermined location on the path. In the embodiment the path is circular.

Figure 4:
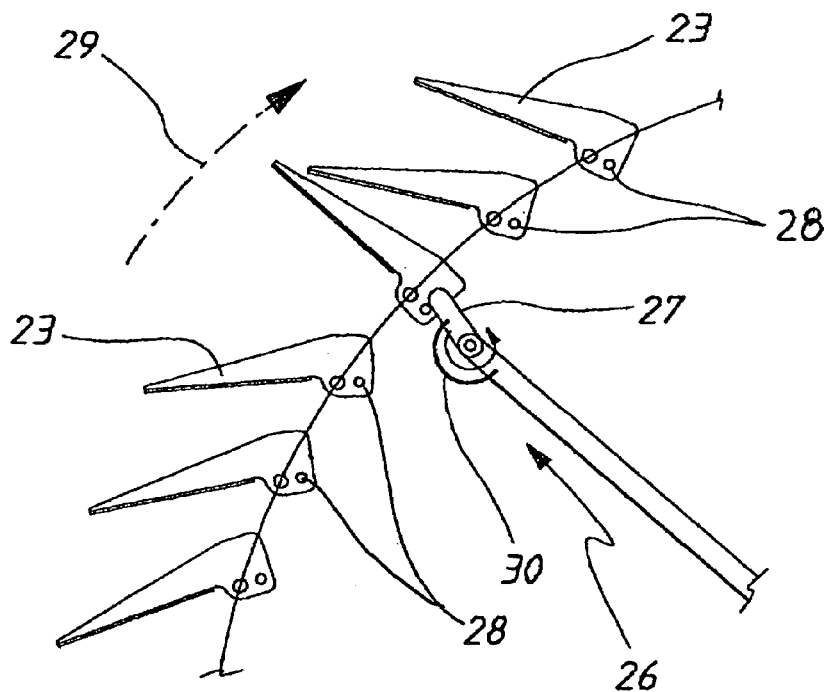
FIG. 4 is a schematic front elevation of portion of the clips of FIG. 3.

At the predetermined angular position 23, there is located a cam mechanism 26. The cam mechanism 26 includes a pivotably mounted arm 27 that engages a projection 28 on each jaw 23 to cause angular deflection of each jaw 23 to the open position. When each jaw 23 passes beyond the cam mechanism 26, the jaw member 23 is released so as to be urged into contact with a bag 12 located between the jaw 21 and the jaw 23. Preferably, the arm 27 is pivotably mounted and is urged by a spring to the position depicted in FIG. 4. As each jaw 23 moves angularly in the direction 29 when engaged with the arm 27, the arm 27 pivots to enable the jaw 23 to pass thereby. A spring 30 urges the arm 27 to the position depicted in FIG. 4.

The motor 19 may be operated so that the bags 12 are located in spaced batches 31, the batches 31 being spaced by one or more empty clips 20. This would then enable the person 11 to engage a single batch 31 with each operation and place the batch 31 in the box 13. Accordingly, the speed of the motor 19 is varied.

The hub 17 includes a central shaft 31 from which there extends a plurality of spokes 32 that are fixed to a rim 33. The clips 20 are mounted on the rim 33 so as to be at the same radius relative to the axis 18, and so as to be equally angularly spaced about the axis 18.

In a further preferred form, each fixed jaw 21 may be provided with a duct 34 to which a vacuum is delivered to aid in securing the bags 12 in position between the jaws 21 and 23. In this respect, it should be appreciated that when not in the open position, the jaws 21 and 23 would be closed, closing off the duct 34. Each duct 34 would communicate with a duct 34 in the rim 33, with the duct 34 in the rim 33 communicating with a duct through one of the spokes 32 to be connected to a duct extending through the shaft 31 to an air pump.

Preferably, the hub 17 would be positioned so that the person 11 has the bags 12 arrive at approximately shoulder height to be gripped and placed in the box 13. In this respect, it should be appreciated that the person 11 may be seated or standing.

Figure 5:
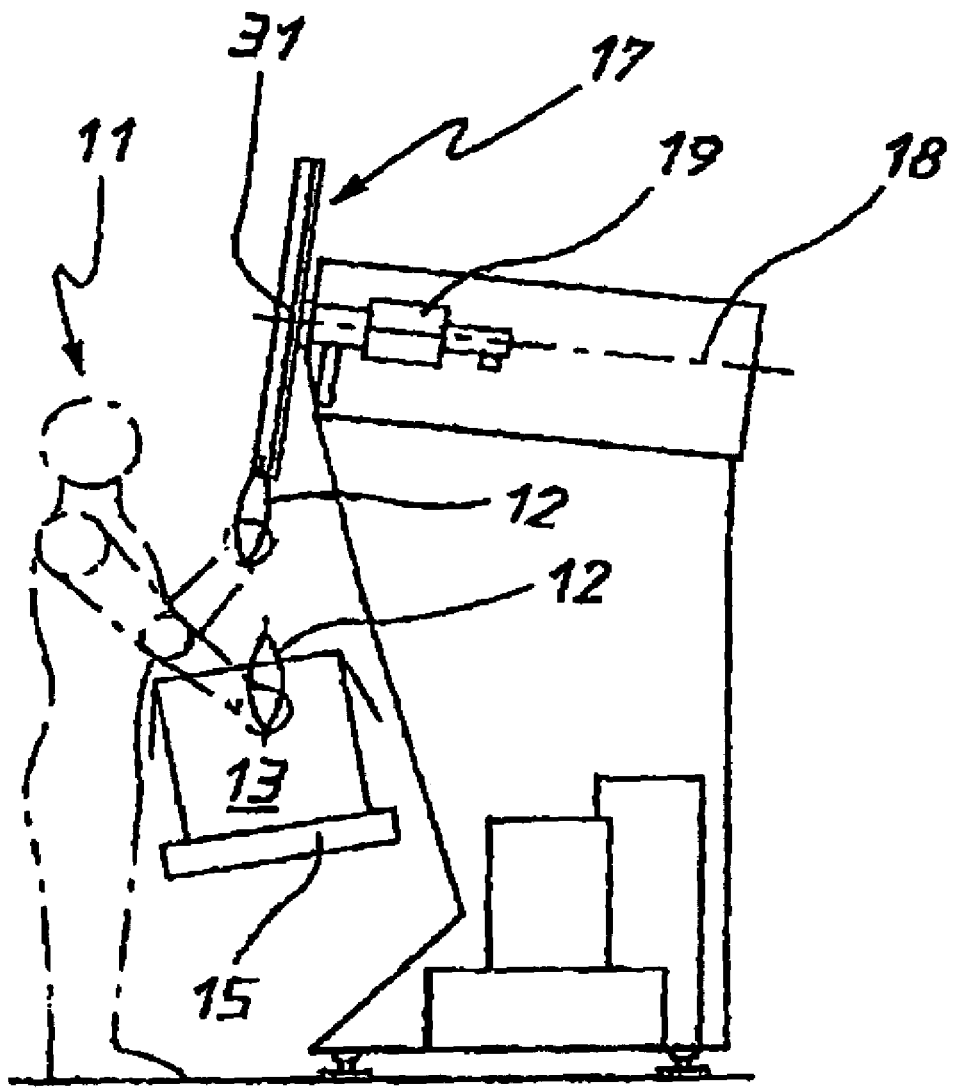
FIG. 5 is a schematic side elevation of a modification of the device of FIG. 1.

The axis 18 is at an angle to the horizontal of between 0° and 20°, preferably about 10°, so that the hub 17 and axis 18 extend upwardly and away from the person 11. The inclination of the axis 18 is shown in FIG. 5.

Accordingly, the clips 20 are moved along a generally circular path having a lowermost segment 35 and an upper segment 36. At the segment 35 the clips 20 are closed while at the segment 36 the clips are open.

The invention claimed is:

1. In combination, a bag conveying device and a plurality of bags being conveyed thereby, the bags containing a product, said device including:
   a base;
   a clip assembly including a hub rotatably mounted on the base for angular movement relative thereto about an axis, a plurality of clips mounted on the hub so as to be moved thereby along a generally circular path having a lower most segment and an upper segment, the clips being adapted to each receive a bag, each clip having an open configuration enabling a bag to be engaged therein and a closed configuration holding a bag located therein each clip including a first jaw, the first jaw being fixed with respect to said hub, and a second jaw movably mounted on the hub so as to be movable with respect to the first jaw between the open and closed positions of the clip;
   a clip actuating mechanism to operate the clips so that the clips move between the open configuration and the closed configuration at predetermined angular positions with respect to said axis so that said clips are in said closed configuration at said lower most segment and in said open configuration at said upper segment;
   drive means to cause angular movement of said hub about said axis so that said bags are delivered to said lower most segment at which a person can be positioned so that the person can engage the bags and remove the bags from the clips; and
   and wherein said conveyor device is configured so that clips locating said bags at said lower most segment expose the bags enabling an operator to grip and remove the bags from the device.

2. The combination of claim 1 wherein said axis is substantially horizontal so that said hub is generally located in a generally vertical plane.

3. The combination of claim 1 wherein said second jaw is resiliently urged towards said first jaw, and said actuating mechanism is a cam member located adjacent said predetermined angular position so as to engage the second jaws to cause pivoting thereof to an open position to receive a bag, with said second jaw moving to the closed position of the clip upon passing said cam member.

4. The combination of claim 1 further including ducting extending to the fixed jaws so that a vacuum delivered thereto will urge the bags into contact with the fixed jaws.

5. The combination of claim 1 wherein said second jaw is resiliently urged towards said first jaw, and said actuating mechanism is a cam member located adjacent said predetermined angular position so as to engage the second jaws to cause pivoting thereof to an open position to receive a bag, with said second jaw moving to the closed position of the clip upon passing said cam member.

6. The combination of claim 1 further including ducting extending to the fixed jaws so that a vacuum delivered thereto will urge the bags into contact with the fixed jaws.

7. In combination, a bag conveying device and a plurality of bags being conveyed thereby, the bags containing a product, said device including:
   a base;
   a clip assembly including a hub rotatably mounted on the base for angular movement relative thereto about an axis, a plurality of clips mounted on the hub so as to be moved thereby along a generally circular path having a lower most segment and an upper segment, the clips being adapted to each receive a bag, each clip having an open configuration enabling a bag to be engaged therein and a closed configuration holding a bag located therein, wherein said axis is inclined by an acute angle to the horizontal so that the hub extends upwardly and away from the person;
   a clip actuating mechanism to operate the clips so that the clips move between the open configuration and the closed configuration at predetermined angular positions with respect to said axis so that said clips are in said closed configuration at said lower most segment and in said open configuration at said upper segment;
   drive means to cause angular movement of said hub about said axis so that said bags are delivered to said lower most segment at which a person can be positioned so that the person can engage the bags and remove the bags from the clips; and
   and wherein said conveyor device is configured so that clips locating said bags at said lower most segment expose the bags enabling an operator to grip and remove the bags from the device.

8. The combination of claim 7 wherein said angle is between 5° and 20°.

9. The combination of claim 8 wherein said angle is about 10°.

10. In combination, a bag conveying device and a plurality of bags being conveyed thereby, the bags containing a product, said device including:

a base;

a clip assembly including a hub rotatably mounted on the base for angular movement relative thereto about an axis, a plurality of clips mounted on the hub so as to be moved thereby along a generally circular path having a lower most segment and an upper segment, the clips being adapted to each receive a bag, each clip having an open configuration enabling a bag to be engaged therein and a closed configuration holding a bag located therein, wherein each clip includes a first jaw, the first jaw being fixed with respect to said hub, and a second jaw movably mounted on the hub so as to be movable with respect to the first jaw between the open and closed positions of the clip;

a clip actuating mechanism to operate the clips so that the clips move between the open configuration and the closed configuration at predetermined angular positions with respect to said axis so that said clips are in said closed configuration at said lower most segment and in said open configuration at said upper segment;

drive means to cause angular movement of said hub about said axis so that said bags are delivered to said lower most segment at which a person can be positioned so that the person can engage the bags and remove the bags from the clips; and and wherein said conveyor device is configured so that clips locating said bags at said lower most segment expose the bags enabling an operator to grip and remove the bags from the device.

* * * * *